Figure 1:
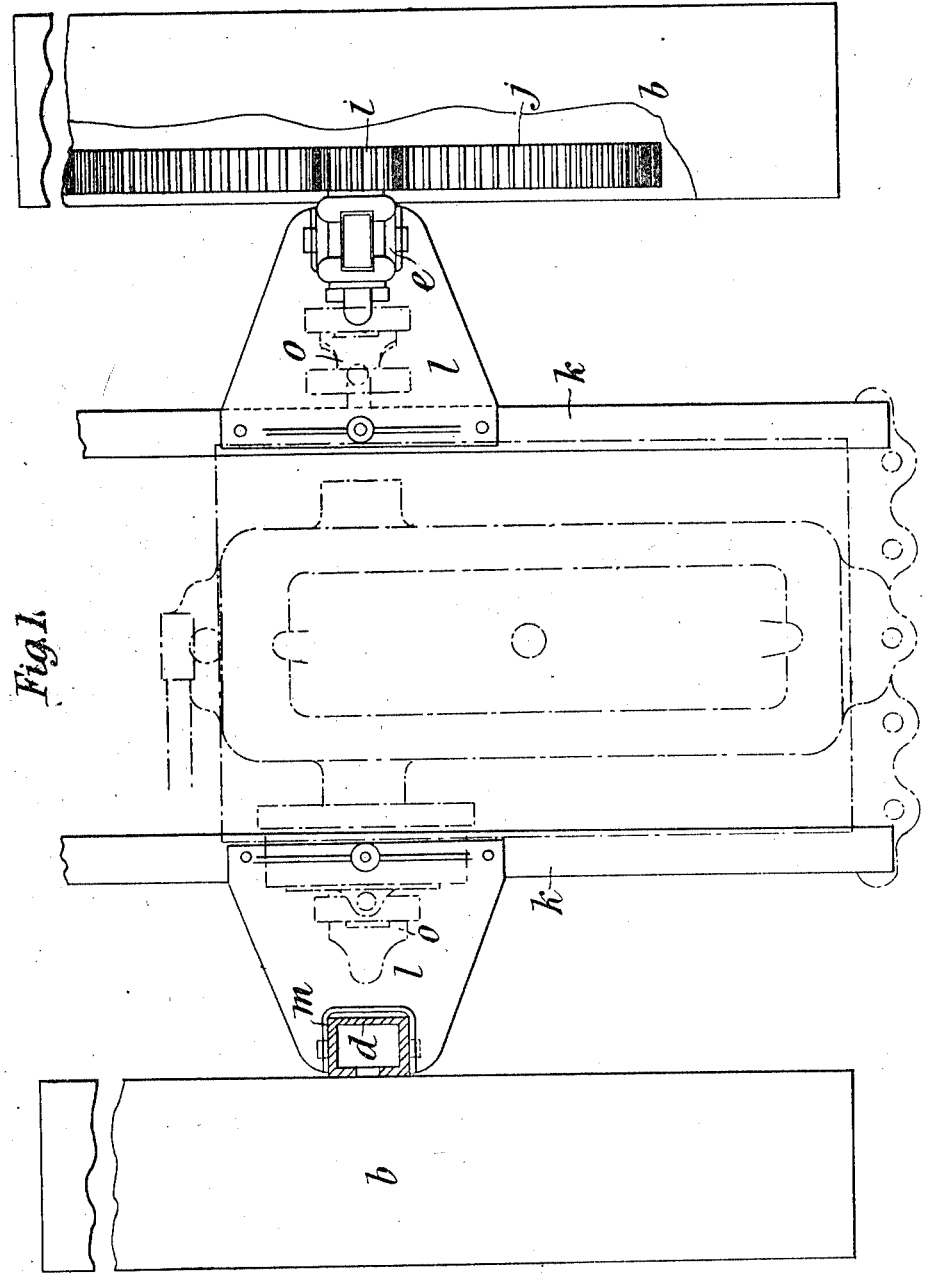

H. P. SAUNDERSON.
SELF PROPELLED VEHICLE FOR TRANSPORT AND TRACTIVE PURPOSES.
APPLICATION FILED NOV. 11, 1910.

1,066,954.

Patented July 8, 1913.

2 SHEETS—SHEET 1.

Witnesses:
J. K. Moore
R. E. Barry.

Inventor:
Herbert P. Saunderson.
by
Whitaker & Prevost
attys.

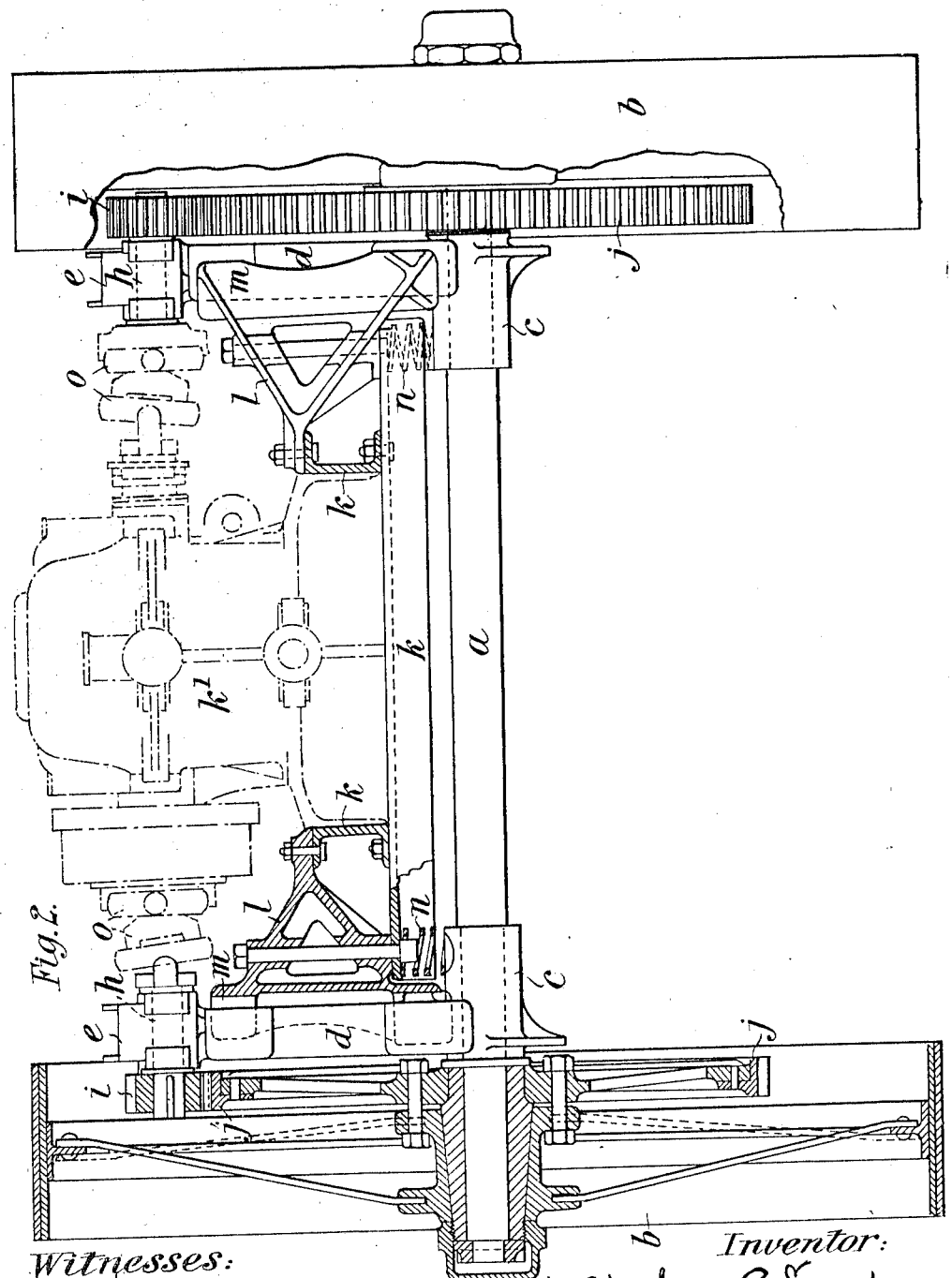

UNITED STATES PATENT OFFICE.

HERBERT PERCY SAUNDERSON, OF BEDFORD, ENGLAND.

SELF-PROPELLED VEHICLE FOR TRANSPORT AND TRACTIVE PURPOSES.

1,066,954.　　　　Specification of Letters Patent.　　Patented July 8, 1913.

Application filed November 11, 1910. Serial No. 591,882.

*To all whom it may concern:*

Be it known that I, HERBERT PERCY SAUNDERSON, a subject of the King of Great Britain, residing at Elstow Works, Bedford, Bedfordshire, England, have invented new and useful Improvements in Self-Propelled Vehicles for Transport and Tractive Purposes, of which the following is a specification.

This invention relates to self-propelled vehicles for transport and tractive purposes and to that class of such vehicle wherein motion is transmitted to the driving wheels through the medium of toothed gearing and wherein the said driving wheels are carried on an axle which has springs in connection with it so as to allow of the rise and fall of the said axle independently of the body or part of the vehicle carrying the motor, provision in the form of a flexible or yielding coupling or joint, being made for allowing of the requisite movement between the motor and the gearing without interfering with the drive, the object of my invention being to provide an arrangement of mechanism of this class which affords greater rigidity than heretofore.

According to my invention the driving wheels are rotatably mounted upon a dead axle which has firmly secured to each end, adjacent to the said wheels, a side-piece which may slide in a guide bracket secured to the framework of the vehicle to provide a spring mounting, the said side-pieces carrying bearings for intermediate shafts which are driven through the intermediary of universal joints.

To enable my invention to be fully understood, I will describe the same by reference to the accompanying drawings, in which:—

Figure 1 is a sectional plan, and Fig. 2 is a sectional elevation of the fore part of a self-propelled vehicle provided with my improvements.

$a$ indicates the dead axle upon which the driving wheels $b$, $b$ are mounted so as to revolve freely thereon, and $c$, $c$ are brackets also fixed to the said axle adjacent to the wheels, and each of which carries a side-piece or pillar $d$ on the upper end of which is mounted a bearing or plumberblock $e$ in which a shaft $h$ is mounted, the said shaft carrying a pinion $i$ which gears with a spur-wheel $j$ fixed to the adjacent driving wheel.

$k$ indicates the main frame or chassis of the vehicle or tractor upon which the driving mechanism (such for instance as that indicated by dotted lines $k^1$) is mounted, and this frame carries the side brackets $l$, $l$ which have portions $m$, $m$ embracing the pillars $d$, $d$ so that the dead axle with the wheels and the said pillars $d$, $d$ is free to rise and fall relatively with the said brackets $l$, $l$.

$n$, $n$ are springs which are advantageously arranged between the frame or chassis $j$ and the brackets $c$, $c$. The shaft of the differential driving mechanism $k^1$ is connected to the shafts $h$, $h$ by universal joints, such as those indicated at $o$, $o$ so as to allow of the relative movement between the driving wheels and the chassis.

With the foregoing arrangement it will be understood that while the traveling wheels are at all times free to follow the inequalities of the road or surface upon which the vehicle or tractor is traveling, the pinions $i$ and spur-wheels $j$ will always remain in proper engagement.

Claims.

1. In a motor vehicle for transport and tractive purposes, the combination with a dead axle extending transversely of the vehicle from one side to the other thereof, and the traction wheels loosely mounted on said axle, of a chassis, supporting springs interposed between the chassis and said axle, vertically disposed pillars secured to said dead axle, vertical guides on said chassis engaging said pillars, independent driving gearing for each of said traction wheels having a part mounted on and movable with said pillar, a motor on the chassis and universal joints connecting the motor positively with the parts of the driving mechanisms, carried by said pillars for driving the traction wheels while permitting the vertical relative movements of said axle and chassis.

2. In a motor vehicle for transport and tractive purposes, the combination with a dead axle extending across the vehicle from one side to the other, of traction wheels loosely mounted on said axle, a chassis, springs interposed between the chassis and said axle, vertical pillars rigidly secured to said axle, vertical guides secured to the chassis and engaging said pillars and having a long vertical guiding engagement therewith, a driving gear secured to each of said traction wheels, a bearing carried by each of said pillars, a driving shaft mounted on each of said bearings, a pinion on each of said shafts in mesh with the driving gear of the adjacent traction wheel, a motor carried by said chassis and universal joints connecting said motor positively with each of said driving shafts.

HERBERT PERCY SAUNDERSON.

Witnesses:
 JOHN E. BOUSFIELD,
 C. G. REDFERN.

Copies of this patent may be obtained for five cents each, by addressing the "Commissioner of Patents, Washington, D. C."